Oct. 30, 1956 H. B. FREY, JR 2,769,096
MULTIPLE-TARGET SOURCES OF RADIOACTIVE RADIATIONS
AND METHODS EMPLOYING THE SAME
Filed April 9, 1952 3 Sheets-Sheet 1

INVENTOR.
HUGH B. FREY JR.
BY
Campbell, Brumbaugh, Free & Graves
HIS ATTORNEYS

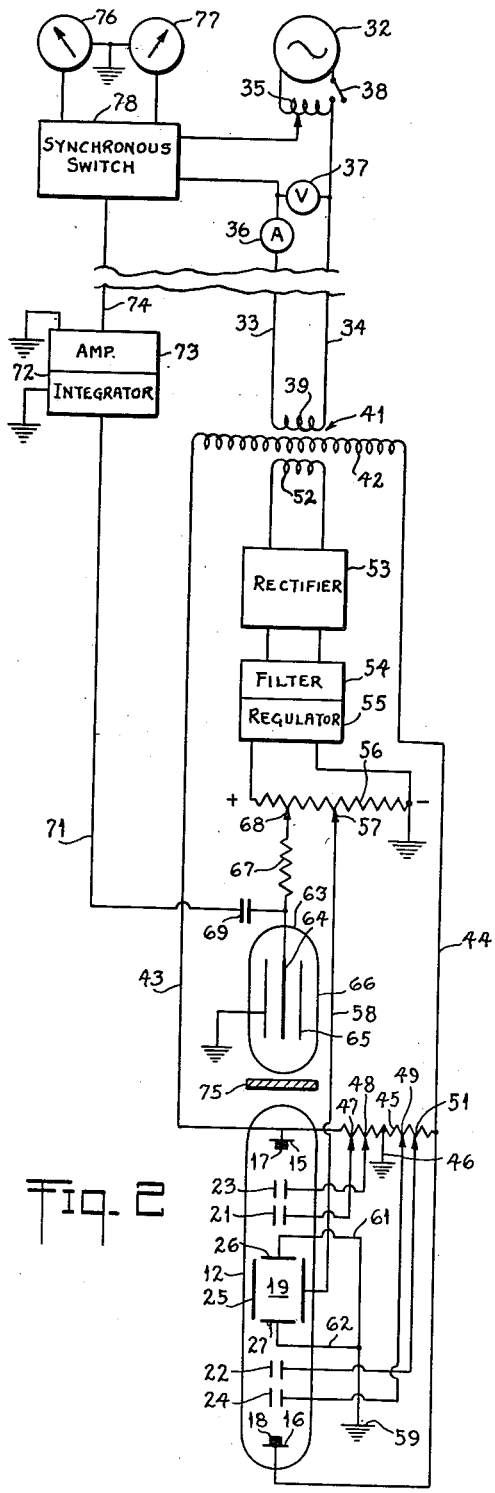

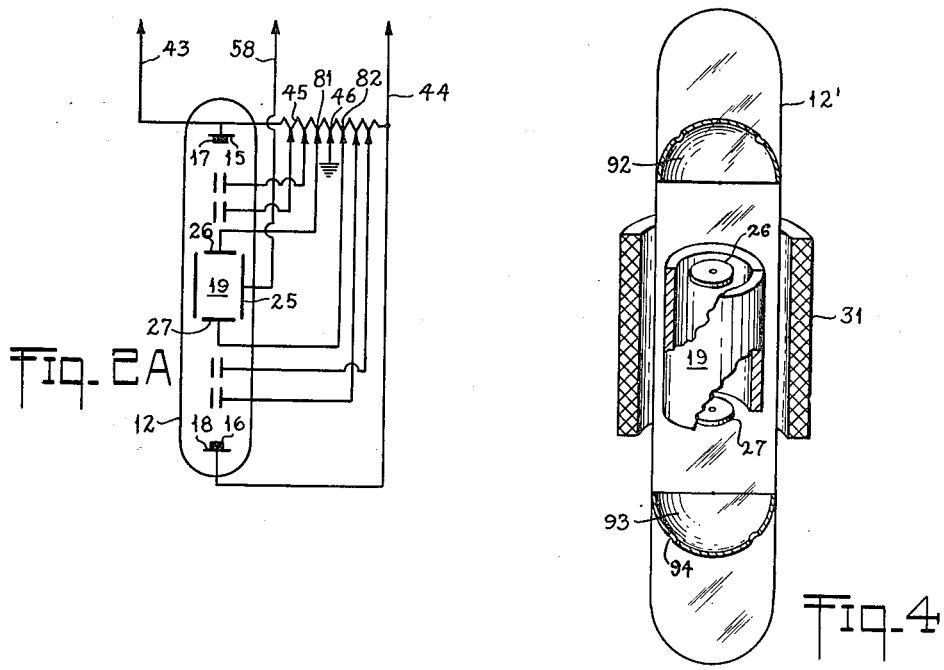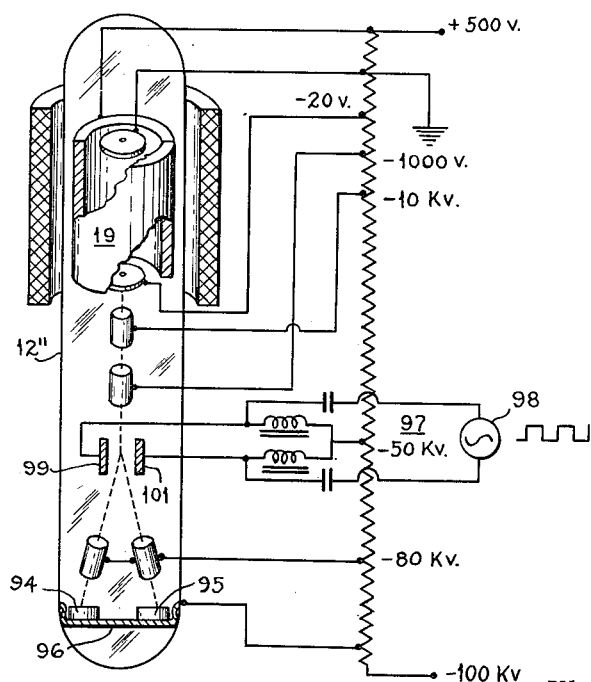

United States Patent Office 2,769,096
Patented Oct. 30, 1956

2,769,096

MULTIPLE-TARGET SOURCES OF RADIOACTIVE RADIATIONS AND METHODS EMPLOYING THE SAME

Hugh B. Frey, Jr., Ridgefield, Conn., assignor to Schlumberger Well Surveying Corporation, Houston, Tex., a corporation of Delaware Application April 9, 1952, Serial No. 281,326

19 Claims. (Cl. 250—83.6)

The present invention relates to sources of radioactive radiations and, more particularly, to novel radiation sources employing a plurality of targets which are bombarded by high-speed particles, and to novel methods of nuclear well logging employing such sources.

There are in present use in many laboratories sources of radioactive radiation which in general comprise a source of electrically-charged particles and a charged-particle accelerator for directing said particles at a high velocity against a reactive target. By properly selecting the type of particles, the target material and the particle velocity at the instant of bombardment, a particular nuclear reaction, as for example the generation of neutrons, may be obtained at the target. As a result of the high cost, complexity and large size of these sources and their associated equipment they have heretofore been unsuited for field use. However, in copending applications Serial No. 275,932, filed March 11, 1952, for "Neutron Well Logging," by Clark Goodman, and Serial No. 281,378, filed April 9, 1952, for "Neutron Source for Well Logging," by John T. Dewan, there are disclosed portable sources which may be readily employed in the field, as for example in the narrow confines of boreholes far beneath the surface of the earth.

It is often desirable, however, to obtain similar nuclear reactions from radioactive sources at a plurality of relatively spaced locations, or different nuclear reactions simultaneously at substantially the same location. In order to accomplish this a plurality of sources of radioactive radiation have heretofore been needed, a requirement which was substantially impossible to satisfy in field applications because of the expense and bulk involved.

Accordingly, it is an object of the present invention to provide novel sources of radioactive radiations wherein a plurality of distinct nuclear reactions may be simultaneously or selectively produced.

In radioactivity well logging of the earth formations traversed by a borehole, a source of neutrons or other radiation such as gamma rays is passed through a borehole and indications obtained of one or more physical phenomena resulting from the interaction of the neutrons or gamma rays on formation materials.

It is a further object of the present invention to provide novel methods for nuclear well logging in which a plurality of controlled nuclear reactions are employed to generate neutrons or other radiation within a borehole.

These and other objects of the invention are attained by providing an evacuated envelope containing a source of charged particles. Targets which contain a substance adapted to enter into a nuclear reaction with said particles are placed within the envelope at several locations spaced from said source of charged particles. Charged particles from the source are accelerated to a sufficient velocity towards each target, either simultaneously or in any desired sequence. The target materials and/or the respective particle velocities may be different for each target, and a plurality of distinct nuclear reactions thus obtained.

In a preferred form of the invention, which is particularly adapted for radioactivity well logging, the particle source, which may be for example a source of deuterium ions (deuterons), is placed intermediate the ends of an elongated, cylindrical envelope. At each end within the envelope there is disposed a suitable target facing the ion source, the electrical potential of which relative to said source may be controlled in a predetermined manner or at the discretion of an operator. The targets at each end may contain the same material, as for example tritium, or each may contain a different material, as for example tritium and deuterium, respectively, and may be sequentially or continuously maintained at a negative potential with respect to the ion source sufficient to accelerate particles from the source to a desired velocity for bombardment of the respective targets. As explained in the aforementioned Goodman application, the bombardment of a target containing tritium or deuterium by deuterons of sufficient velocity will generate neutrons.

This source of radioactive radiations may be placed in a suitable pressure-resistant housing and passed through a borehole for the purpose of bombarding the formations with neutrons from the respective targets. If a neutron or gamma ray detector is placed in the vicinity of one end of the elongated envelope and synchronized with alternately activated targets, so-called neutron-neutron or neutron-gamma logs will be obtained for two different source-detector spacings. Other novel logging methods and improved neutron logging methods, employing the multiple-target radiation source, will be explained hereinafter.

The invention will be more fully understood with reference to the accompanying drawings, in which:

Fig. 2 is a schematic diagram of one form of an electrical circuit that may be employed with the radiation source shown in Fig. 1 for causing the targets to be sequentially bombarded;

Fig. 2A is a schematic diagram of a modified portion of the electrical circuit shown in Fig. 2;

Fig. 3 is a schematic diagram of a second form of an electrical circuit that may be employed with the radiation sources shown in Fig. 1 for causing the targets to be continuously bombarded;

Fig. 4 is a view in longitudinal section of a modified form of multiple-target radiation source;

Fig. 5 is a view in longitudinal section of another form of two-target radiation source.

The novel multiple-target radioactive radiation sources are hereinafter described in connection with new and improved well logging methods, but it is to be understood that multiple-target radiation sources constructed in accordance with the present invention may be employed in any suitable location as, for exampule, in laboratories interested in nuclear research.

Figure 1:
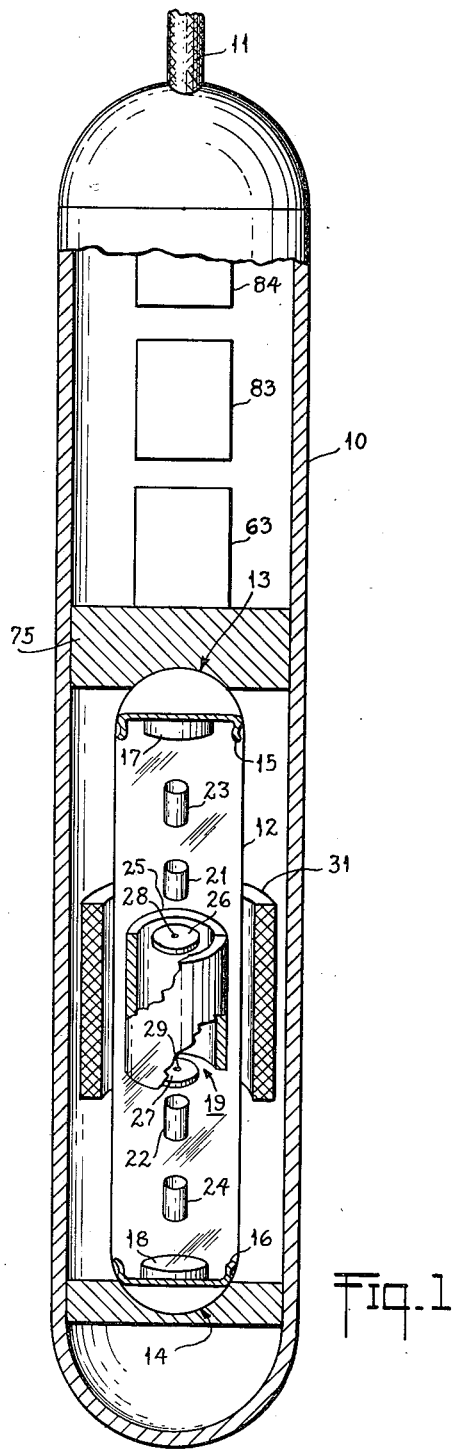
Fig. 1 is a view in longitudinal section showing a two-target radiation source constructed in accordance with the invention and contained within well logging apparatus.

In Fig. 1, a hollow, pressure-resistant housing 10, constructed of steel for example, is adapted to be passed through a bore hole by means of a conventional electrical cable 11. Within the housing 10 is an elongated, pressure-resistant envelope 12 which may be manufactured from out-gassed glass or other conventional material. Adjacent each end 13 and 14 of the envelope 12 are placed target electrodes 15 and 16, respectively, having target materials 17 and 18, respectively, mounted thereon. Centered in and coaxial with the envelope 12 is an ion source 19. Between the ion source 19 and the target electrode 15 there may be spaced one or more electrodes, as for example ion extraction and focussing electrodes 21 and 23. Between the source 19 and the target electrode 16 there may be spaced similar electrodes 22 and 24.

The ion source 19 is of the cold-cathode low-pressure type and may take the form of a Philips ionization gauge, the theory of which is fully described in "Vacuum Equipment and Techniques" by Guthrie and Wakerling (McGraw-Hill, 1949) on pages 128–137. The ion source comprises a cylindrical tubular anode electrode 25 and disc-shaped cathode electrodes 26 and 27 spaced apart from the electrode 25 at either end thereof. The cathode electrodes 26 and 27 have apertures 28 and 29 therein opposite the target electrodes 15 and 16, respectively. A solenoid or permanent magnet 31, placed concentrically about the ion source 19 provides a strong magnetic field axially through the cylindrical anode electrode 25.

In a typical embodiment the envelope 12 may be evacuated and then filled with deuterium gas at a pressure of approximately $10^{-4}$ millimeters of mercury. The target materials 17 and 18 may contain tritium, and each may be constructed as a tungsten disc coated with zirconium that is impregnated with tritium.

One manner in which the two-target radiation source shown in Fig. 1 may be operated is explained in connection with Fig. 2. In Fig. 2 an electric power source 32, which may provide a constant amplitude alternating potential, supplies the necessary operating voltages from the surface of the earth to the equipment within the housing 10 by means of insulated cable conductors 33 and 34. The potential difference appearing between the conductors 33 and 34 is preferably adjustable, for example, by an autotransformer 35. The current and potential are observable by means of meters 36 and 37, respectively. A conventional disconnecting switch 38 is inserted in the output of the source 32. The conductors 33 and 34 are connected across a primary winding 39 of a multi-winding transformer 41 within the housing 10. The alternating potential difference across the winding 39 is stepped-up, if necessary, by means of a secondary winding 42 of the transformer 41 to a predetermined peak value in the range of from 20 to 100 kilovolts where the radiation source employs a deuterium ion source and a tritium target substance. This alternating potential across the secondary winding 42 is supplied by means of conductors 43 and 44 across a resistor 45 to the target electrodes 15 and 16, respectively. The resistor 45 is tapped to ground by means of a variable contact 46 intermediate the ends thereof. If, for example, the resistor 45 is center-tapped by the contact 46, target electrodes 15 and 16 will alternately be at equal but opposite-polarity potentials. Additional contacts 47, 51 and 48, 49 on the resistor 45 supply the potentials necessary for the operation of ion extraction and focussing electrodes 21, 22 and focussing electrodes 23, 24, respectively.

A third winding 52 of the transformer 41 applies a substantially constant amplitude alternating potential to a rectifier 53 which supplies direct current through a smoothing filter 54 and a voltage regulator 55 to a load resistor 56. A tap 57 on the resistor 56 applies a positive potential, say 500 volts, over a conductor 58 to the cylindrical anode 25 of the ion source 19. The disc-shaped cathodes 26 and 27 may be grounded at 59 by means of conductors 61 and 62, respectively.

The target electrodes 15 and 16 are alternately at high negative and positive potentials with respect to the ion source cathodes 26 and 27, whereas the ion anode electrode 25 is maintained at a constant positive potential with respect to the cathodes 26 and 27. As a result of the interaction of the electric field caused by the potential difference between the cathode electrodes 26 and 27 and the anode electrode 25 and the axial magnetic field, ions will be created even in the presence of extremely low gas pressure. When deuterium gas is employed as explained in the above-mentioned Dewan application, deuterons will be produced by the ion source 19. When the target electrode 15 becomes negative with respect to the cathode 26, deuterons will tend to be accelerated towards this target. When the target electrode 15 reaches a high negative potential, say 20 kilovolts, deuterons will bombard the target material 17 with sufficient velocity to generate neutrons at an energy level of substantially 14 million electron volts (m. e. v.). As the negative accelerating potential is increased still further, say to 100 kilovolts, the flux intensity of the 14 m. e. v. neutrons will increase, but will decrease and then reach zero as the accelerating potential is decreased.

During the next half cycle, the target electrode 16 will be similarly activated. It can thus be seen that neutrons will be alternately generated at targets 15 and 16, respectively.

The cyclically operated neutron sources have many well logging applications, as will be hereinafter explained. For example, a radioactivity detector 63 may be placed opposite one end 13 of the envelope 12. The detector 63 may be, for example, a Geiger counter adapted to produce an electrical pulse in response to an impinging gamma particle, the frequency of the pulses being proportional to the flux intensity of the gamma radiation present. The detector 63 may be conventionally constructed with a center wire anode 64 surrounded by a cylindrical tubular cathode 65, and both electrodes are contained within an envelope 66 filled with gas. The center wire anode 64 is supplied with a positive potential, say 1000 volts, through a series impedance 67 connected by a contact 68 to the load resistor 56. The cylindrical cathode 65 may be grounded. The pulse output may be applied through a coupling capacitor 69 and a conductor 71, to, for example, an integration circuit 72 and an amplifier 73. The output signal from the amplifier 73 is transmitted to the surface of the earth by means of an insulated cable conductor 74.

A suitable shield 75, as for example several inches of lead, is preferably placed between the radioactivity detector 63 and end 13 of the envelope 12. The shield 75 may be eliminated altogether, if desired, since the deuterium-tritium reaction yields a low intensity of gamma radiation.

In neutron well logging the spacing between the neutron source and the radioactivity detector is critical. If the spacing is less than a certain relatively short distance, the output of the detector will increase with the hydrogen content of the surrounding medium, but if the spacing is more than this distance, the output will decrease with increasing hydrogen content. The critical distance from the neutron source of the "cross-over" zone is a function of the hydrogen content of the liquid in the borehole, and may be from 4 to 8 inches. However, if the spacing between the target electrode 15 and the detector 63 is on the order of 3 inches, when neutrons are emitted from the target material 17, the pulse frequency of the detector 63 will increase with increased hydrogen content of the surrounding formations. However, when neutrons are emitted by the target material 18, the detector output will decrease with hydrogen content, since the target electrode 16 is on the order of 20 to 24 inches from the detector 63.

The output of the detector 63 is preferably separately recorded during alternate half cycles of target activations. For example, a switch 78 may be synchronized by the alternating current source 32 to connect a recording galvanometer 76 to the conductor 74 during the period when the target material 17 is activated and to connect a similar galvanometer 77 to the conductor 74 when the target material 18 is activated. Accordingly, two continuous logs are simultaneously obtained for substantially the same detector depths in the borehole, one varying directly with hydrogen content, the other inversely. Accordingly, a novel method is provided for obtaining a plurality of indications of the hydrogen content of formation material and thus formation porosity, at the same level, one corresponding to a short radius of investigation and great detail, the other to a larger radius but with less detail.

It will be understood that the detector 63 may be beyond the critical spacing for both the target electrode 15 and the target electrode 16, and two logs obtained which vary inversely with hydrogen content but with different radii of investigation and detail.

By moving the contact 46 on the resistor 45, the high potentials applied to the target electrodes 15 and 16 may be adjusted to different respective maxima. For example, the target electrodes 15 and 16 may have negative maxima of 20 kilovolts and 100 kilovolts, respectively, whereby the neutron flux intensity from the target material 18 will be substantially greater than the flux intensity from the material 17. As a result of the detector-source spacings this inequality will have advantages under certain circumstances.

Figure 7:
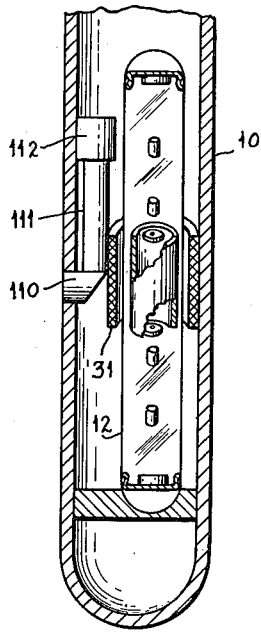
Figs. 6 and 7 are views in longitudinal section showing two ways in which radioactivity detectors may be associated with the multiple-target radiation source.
Figure 6:
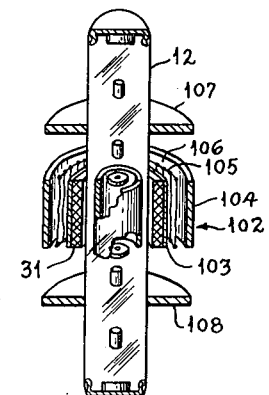

Alternatively, the radioactivity detector 63 may be placed intermediate the target electrodes 15 and 16, as shown in Figs. 6 and 7 for example. If substantially the same neutron flux intensity is emitted by both targets, a differential log may be obtained, the meters 76 and 77 showing a difference in amplitudes only when a formation boundary or a change in the hydrogen content of formation material is passed. This differential log may be recorded on a single meter, if desired, by employing any well-known electrical comparing circuit, the output signal from which is directly proportional to the difference in the amplitudes or frequencies of the two input signals. If different neutron flux intensities are employed, a centered detector will give alternate radioactivity indications corresponding to the different flux intensities at an equal detector-source spacing. This mode of operation is valuable, for example, in determining the effect of the drilling liquid on the respective measurements.

Different nuclear reactions may be produced at each target irrespective of the placement of the detector 63 with respect to the target electrodes 15 and 16. For example, while employing deuteron particles, the targets may be impregnated one with tritium and the other with deuterium. If both targets are maintained at 100 kilovolts, for example, neutrons of different energies, substantially 14 m. e. v. from the tritium target and 2.3 m. e. v. from the deuterium target, will be emitted and separate radioactivity indications may be obtained. Since the formation reaction is a function of the neutron energy, the separate indications will have individual interpretations. Other reactions or combinations of reactions may be employed. For example, beryllium or lithium targets when bombarded by deuterons will emit neutrons.

The detector 63 may be made responsive to induced gamma radiation, that is gamma rays of from 2 to 8 m. e. v., but substantially unresponsive to direct and scattered gamma radiation, that is gamma rays having less than about 1 m. e. v. energy, by placing a lead shield therearound having a thickness of, say, ¼ inch. Alternatively, the detector 63 may be made responsive substantially only to neutrons, whereby neutron-neutron logs may be obtained. In a preferred arrangement the detector 63 is made responsive simultaneously to both induced gamma radiation and thermal neutrons to increase substantially the resolution of the measurements. For example, the detector 63 may be a Geiger-Muller counter having a thin cadmium sheath, say 1 millimeter in thickness, placed inside the ¼ inch lead shield.

The detector 63 may be a counter of the type filled with $BF_3$ and thus capable of detecting primarily gamma radiation in the Geiger range of operation and primarily neutron radiation in the proportional range of operation.

The response of the detector 63 may be changed from a proportional to a Geiger characteristic by increasing its anode potential. Thus the gamma radiation produced in the formations as a result of neutrol emission from the target 15 may be detected by operating the detector 63 in the Geiger range during the interval when the target 15 is being bombarded. On the other hand, neutron radiation received from the formations in response to neutron emission from the target 16 may be detected by lowering the anode potential and consequently operating the detector 63 in the proportional range during the half cycle in which the target 16 is being bombarded.

In the following arrangement, two neutron-neutron logs and two neutron-gamma logs may be simultaneously obtained, with but a single detector. During a first full cycle of target activations, the detector 63 is neutron responsive and thus neutron-neutron logs are obtained for two spacings and/or two neutron flux intensities, and/or two neutron energies. During the next full cycle, the detector 63 is gamma responsive and thus neutron-gamma logs are obtained for two spacings and/or two gamma intensities, and/or two gamma energies. Obviously four recorders may be employed, each synchronized with the alternating current source 32.

In Fig. 2A, there is shown a modification of the electrical circuit shown in Fig. 1 whereby the particle acceleration may be made even more efficient. The ion source cathodes 26 and 27 are tapped to the resistor 45 by contacts 81 and 82, respectively, on either side of the ground contact 46 whereby each cathode becomes slightly negative as its associated target electrode becomes highly negative. Thus more particles will tend to pass through the apertures 28 and 29 (Fig. 1) at the correct instants.

Fig. 1 illustrates one manner in which the electrical equipment shown in Fig. 2 may be incorporated into the housing 10. The shield 75 preferably extends for the full diameter of the housing 10 and may be employed as a mounting for radiation source envelope 12. It should be noted that due to the relatively low percentage of gamma radiation emitted by the target materials 17 and 18, when neutron-gamma logs are being obtained, the shield 75 need only be a thin sheet of lead, or no shield at all need be employed. When neutron-neutron logs are being obtained, the shield 75 should be composed of hydrogenous material, as for example paraffin. The rectifier 53, the filter 54 and the voltage regulator 55 may be placed in suitable direct voltage control housing 83. The amplifier 73 and the integrator 72 may be placed in a housing 84. Thus, when the housing 10 is passed through a borehole, continuous radioactivity logs may be recorded at the surface as a function of the depth of the housing.

Fig. 3 shows a typical electrical circuit for simultaneously radioactivating the materials 17 and 18 on the target electrodes 15 and 16. In this embodiment the target electrodes 15 and 16 are each maintained at a sufficient negative potential with respect to the ion source cathodes 26 and 27, which may be grounded. The cylindrical tubular anode 25 is at a positive potential, say 500 volts. Thus both target electrodes are simultaneously bombarded by deuterons, resulting in nuclear emission from the target materials 17 and 18.

The direct operating potentials may be supplied in any convenient manner. For example, a constant amplitude alternating current source 32' may be connected by cable conductors 33' and 34' to the primary 39' of a step-up transformer 41'. The high amplitude alternating voltage appearing across the secondary 52' of the transformer 41' may be applied to a rectifier 53', a filter 54' and a voltage regulator 55', and the resultant constant high amplitude direct voltage applied across a load resistor 85. The resistor 85 is grounded at a point 86 intermediate positive and negative ends. A tap 87 supplies a suitable negative direct voltage to target electrodes 15 and 16, A positive tap 88 supplies a positive voltage for the cylindrical anode 25.

The nuclear reaction on the formation material caused by the neutrons emitted by the target materials 17 and 18 may be detected by a suitable neutron and/or gamma ray detector 63' located intermediate the target electrodes 15 and 16. Since a plurality of targets are employed, the effective neutron flux intensity is increased with a resulting increase in logging accuracy because the irradiated volume is increased. It will be understood that a suitable off-on switch may be employed whereby the operator at the surface may select only one or the other of the targets for bombardment. If desired, the targets in this embodiment may be alternately bombarded by employing controllable shutters in the ion beam path, as disclosed in the aforementioned Goodman application.

Alternatively, the target materials 17 and 18 may be simultaneously bombarded but only during discrete time intervals. Thus in Fig. 2, the electrodes 21 and 23 and the target electrode 15 may be connected to the taps 51 and 49 and the conductor 44, respectively, instead of as shown. Under these conditions each target emits neutrons at the same instant but only during alternate half cycles.

In Fig. 3 the high voltage for the radioactivity detector 63' may have its anode potential supplied from a tap 89 through an impedance 67'. The output signal from the detector 63' is sent to a recording means 91 at the surface of the earth over a conductor 74', after passing through an integrator circuit 72' and an amplifier 73'.

Fig. 4 illustrates a modified accelerator requiring no ion extraction and focussing electrodes. Target electrodes 92 and 93 replace the target electrodes 15 and 16, respectively, of Fig. 1 and are coated with suitable target material. The electrodes 92 and 93 are concave toward the ion source 19 and may be hemispherical, for example, and placed as close to the ion source 19 as is electricaly possible. The design and placement of target electrodes 92 and 93 is such as to subtend the largest possible solid angle with respect to the apertures 28 and 29 in the cathodes 26 and 27, respectively. Thus few of the ions leaving the source 19 will avoid striking the target material. Since the operation of the ion source tends to deplete the amount of gas and lower the gas pressure, it is desirable to increase the volume of gas at the suitable low pressure. Preferably the envelope 12' extends beyond target electrodes 92 and 93 in order to provide the additional evacuated volume containing the low pressure ionizable gas. There should be free gas passage between the source 19 and the remote portions of the envelope 12', as for example by means of ports 94 in the target electrodes 92 and 93. Alternatively, a second gas envelope may be provided at a convenient location and connected to the envelope 12 or 12' by one or more ducts. This latter arrangement is advantageous when the detector 63 is to be placed as near as possible to either target electrode.

Fig. 5 illustrates a form of the invention in which a plurality of targets 94 and 95 are located at substantially the same level and connected to a common electrode 96. The ion beam from the source 19 is caused to impinge on the targets alternately by an appropriate sweep circuit 97 including a source 98 of voltage and deflection electrodes 99 and 101. Each target may consist of a different material thus giving a different nuclear reaction. The accelerating potential may likewise be varied to provide a proper accelerating voltage as the beam strikes each target. The multiple target arrangement shown in Fig. 5 may be combined with the double-ended modifications heretofore described to provide for a plurality of selectively activated targets at two separate locations.

If it is desired that detector 63' in Fig. 3 be of the class described as ionization chambers, Geiger counters, and proportional counters, it may be constructed as shown in Fig. 6. In Fig. 6 a radioactivity detector 102 comprises a first tubular cathode 103 placed axially about the magnetic means 31. The detector 102 should be designed to minimize the effect of the strong magnetic field or may be magnetically shielded. For this latter purpose the cathode 103 may be made out of material having high magnetic permeability such as Mumetal in order to produce a substantially magnetic-field free space within the detector 102. A second cathode 104 at the same potential as the cathode 103 is placed about an annular grid of anode wires 105 and the entire annular recess 106 between the two cathodes enclosed and filled with ionizable gas in a well-known manner. Shields 107 and 108 are provided surrounding the envelope 12 to protect the detector 102 from direct radiation from the targets.

Since radioactivity detectors of the type disclosed in Fig. 6 may be sensitive to magnetic fields, the scintillation detector shown in Fig. 7 may be employed, as disclosed in copending application Serial No. 255,482, filed November 8, 1951, by Clark Goodman. In Fig. 7 a crystal 110 which emits light in response to radioactivity is mounted in the wall of the housing 10. The light pulses are transmitted through a suitable light transmission channel 111 to a photo-sensitive device 112, the output of which may be transmitted to the surface for recording. Thus the electronic elements which could be adversely affected by magnetic fields are removed from proximity with the magnetic means 31.

In Fig. 2 an alternating potential system is employed whereas in Fig. 3 a direct potential system is shown. These systems may be combined whereby one target electrode is continuously activated and the other activated cyclically or at the discretion of the operator. Thus a modulated neutron log may be obtained. Also, in the embodiments shown schematically in Fig. 2 it may be preferable to always maintain an ion beam and to this end the target electrodes 15 and 16 may be maintained continuously at from 15 to 20 negative kilovolts, for example, and then alternately pulsed to 100 negative kilovolts. Further, while a single radioactivity detector has been disclosed with each embodiment, it will be understood that a plurality of detectors may be employed.

It is evident that the invention may take many alternate forms not specifically illustrated and accordingly the scope of the invention is limited only by the appended claims.

I claim:

1. A source of radioactive radiation comprising an ion source, a plurality of targets each including a substance adapted to react with impinging ions to produce radioactive radiation, and means for projecting ions from said source to said targets.

2. A source of radioactive radiation comprising an ion source, a plurality of ion beam accelerators respectively disposed to accelerate ions from said source in differently directed ion beam paths, a plurality of targets respectively disposed in said ion beam paths, each target including a substance adapted to react with impinging ions to produce radioactive radiation associated with each accelerator, and means to operate said accelerators.

3. A source of radioactive radiation comprising an ion source, a plurality of linear ion baem accelerators respectively disposed to accelerate ions from said source in differently directed ion beam paths, a plurality of targets respectively disposed in said ion beam paths, each target including a substance adapted to react with impinging ions to produce radioactive radiation associated with each accelerator, and means to operate said accelerators sequentially.

4. A source of radioactive radiation comprising an ion source providing beams of ions in substantially opposite directions, two linear ion beam accelerators, and a respective target associated with each of said accelerators and including a substance adapted to react with impinging ions to produce radioactive radiation.

5. A source of radioactive radiation comprising an ion source providing beams of ions in substantially opposite directions, two linear ion beam accelerators, a respective target associated with each of said accelerators and including a substance adapted to react with impinging ions to produce radioactive radiation, and means for sequentially energizing said ion beam accelerators.

6. A source of radioactive radiation comprising an ion source providing beams of ions in substantially opposite directions, two linear ion beam accelerators, a first target associated with one of said accelerators and including a substance adapted to react with impinging ions to produce one type of radioactive radiation, a second target associated with the other of said accelerators and including a substance adapted to react with impinging ions to produce a second type of radioactive radiation, and an envelope containing said ion source, said accelerators and said targets and filled with ionizable gas.

7. A source of radioactive radiation comprising an ion source, an ion beam accelerator, a target including a substance adapted to react with impinging ions to produce radioactive radiation, a first envelope containing said ion source, said accelerator and said target and filled with ionizable gas at a low pressure, a second envelope at least partially enclosing said first envelope and defining a further volume of gas at said low pressure, and means defining an aperture communicating with the interior of said first envelope and with said further volume, said aperture being of a construction to afford pressureless gas flow from said volume to said ion source for replenishing said ion source.

8. A source of radioactive radiation comprising an ion source, an ion beam accelerator, first and second targets associated with said accelerator including substances adapted to react with impinging ions to produce first and second types of radioactive radiation, respectively, and means for deflecting the ion beam to one or the other of said targets.

9. Apparatus for investigating matter with radioactive radiation comprising an ion source, a plurality of targets each including a substance adapted to react with impinging ions to produce radioactive radiation, means for projecting ions at said targets, means for separately detecting radioactive radiation responsive to radiation from each of said targets, and means for separately indicating the detected radiation.

10. Apparatus for investigating matter with radioactive radiation comprising an ion source, a plurality of ion beam accelerators, a respective target including a substance adapted to react with impinging ions to produce radioactive radiation associated with each accelerator, means for detecting radioactive radiation responsive to radiation from said targets, means for operating said accelerators sequentially, and means for separately indicating the detected radiation in synchronism with the operation of each accelerator.

11. Apparatus for investigating matter with radioactive radiation comprising an ion source, a plurality of linear ion beam accelerators, a first target including a substance adapted to react with impinging ions to produce one type of radioactive radiation associated with one of said accelerators, a second target including a substance adapted to react with impinging ions to produce a second type of radioactive radiation, means for separately detecting radioactive radiation responsive to radiation from each of said targets, means for operating said accelerators, and means for separately indicating the detected radiation.

12. A source of radioactive radiation comprising an ion source having an apertured cathode through which ions are arranged to stream, a target for the ions subtending a large solid angle relative to the aperture, said target including a substance adapted to react with impinging ions to produce radioactive radiation, an envelope containing said ion source and said target and filled with ionizable gas, field generating means adapted to act on said ion source to increase the probability of ionization of gas molecules therein, and means to apply a sufficient potential difference between said cathode and said target to accelerate the ions to such velocity as to react with said substance.

13. A source of radioactive radiation according to claim 12 wherein the target is substantially hemispherical with regard to its ion-receiving surface and is placed sufficiently close to the cathode to receive substantially all the ions streaming through the aperture therein.

14. A method of investigating earth formations comprising the steps of passing an ion source through a borehole, bombarding a plurality of targets with ions from said source, each target including a substance adapted to react with impinging ions to produce radioactive radiation, detecting radioactive radiation adjacent said targets received from the formations in response to the radiation from each of said targets, and indicating the detected radiation outside the borehole.

15. A method of investigating earth formations comprising the steps of passing an ion source through a borehole, bombarding a plurality of targets with ions from said source, one of said targets including a substance adapted to react with impinging ions to produce one type of radioactive radiation and another of said targets including a substance adapted to react with impinging ions to produce another type of radioactive radiation, detecting radioactive radiation adjacent said targets received from the formations in response to the radiation from each of said targets, and indicating the detected radiation outside the borehole.

16. A method of investigating earth formations comprising the steps of passing an ion source through a borehole, bombarding a plurality of targets with ions from said source, each target including a substance adapted to react with impinging ions to produce radioactive radiation, detecting radioactive radiation intermediate said targets received from the formations in response to the radiation from each of said targets, and indicating the detected radiation outside the borehole.

17. A method of investigating earth formations comprising the steps of passing a cold-cathode, low-pressure ion source through a borehole, sequentially bombarding a plurality of targets with ions from said source, each target including a substance adapted to react with impinging ions to produce radioactive radiation, separately detecting radioactive radiation adjacent said targets received from the formations in response to the radiation from each of said targets, and separately indicating the detected radiation outside the borehole.

18. A method of investigating earth formations comprising the steps of passing a cold-cathode, low-pressure ion source through a borehole, sequentially bombarding a plurality of targets with ions from said source, each target including a substance adapted to react with impinging ions to produce radioactive radiation, separately detecting at a point unequally spaced from said targets radioactive radiation received from the formations in response to the radiation from each of said targets, and separately indicating the detected radiation outside the borehole.

19. A source of radioactive radiation comprising, an envelope containing low pressure deuterium gas as a deuteron supplying medium, a pair of targets in said envelope respectively having a charge of a heavy form of hydrogen productive of neutron radiation upon impingement thereon of targetward directed deuterons, and electric circuit means adapted when energized to produce between said targets a periodically reversing field to direct said deuterons against first one and then the other of said targets.

References Cited in the file of this patent

UNITED STATES PATENTS 1,836,569     Benjamin _____ Dec. 15, 1931

(Other references on following page)

UNITED STATES PATENTS

| | | |
|---|---|---|
| 2,287,619 | Kallmann et al. | June 23, 1942 |
| 2,287,620 | Kallmann et al. | June 23, 1942 |
| 2,334,262 | Hare | Nov. 16, 1943 |
| 2,489,436 | Salisbury | Nov. 29, 1949 |
| 2,600,151 | Backus | June 10, 1952 |

OTHER REFERENCES

Radioactivity and Nuclear Physics, by James M. Cork, 2nd edition, Van Nostrand Co., 1950, pp. 229–233.